United States Patent [19]

Blount

[11] 4,041,300

[45] Aug. 9, 1977

[54] PHOTOFLASH ARRAY WITH DISCHARGE PATH FOR ELECTROSTATIC CHARGES

[75] Inventor: Richard Blount, South Euclid, Ohio

[73] Assignee: General Electric Company, Schenectady, N.Y.

[21] Appl. No.: 626,339

[22] Filed: Oct. 28, 1975

[51] Int. Cl.² ............................ G03B 15/02; H05F 3/00
[52] U.S. Cl. .................................... 240/1.3; 361/212
[58] Field of Search ................. 240/1.3; 317/2 R; 428/922; 431/93, 95 R, 95 A, 97; 361/212

[56] References Cited

U.S. PATENT DOCUMENTS

| | | | |
|---|---|---|---|
| 2,416,202 | 2/1947 | Naumann | 317/2 R |
| 3,094,436 | 6/1963 | Schroder | 317/2 R X |
| 3,265,804 | 8/1966 | Berger et al. | 317/2 R X |
| 3,309,513 | 3/1967 | Aymar | 240/1.3 |
| 3,598,984 | 8/1971 | Slomski | 240/1.3 |
| 3,710,704 | 1/1973 | Wagner | 240/1.3 |
| 3,884,615 | 5/1975 | Sobieski | 431/95 |
| 3,894,226 | 7/1975 | Hanson | 240/1.3 |
| 3,941,992 | 3/1976 | Blount et al. | 240/1.3 |

*Primary Examiner*—Fred L. Braun
*Attorney, Agent, or Firm*—Norman C. Fulmer; Lawrence R. Kempton; Frank L. Neuhauser

[57] ABSTRACT

A multiple flash lamp array having a plastic housing provided on the surface thereof with a pattern of electrically conductive material, and one or more openings through the housing wall at a location adjacent to the outer pattern of conductive material and communicating with an electrical ground of circuitry contained within the array, to provide a discharge path for an electrostatically charged person or object touching the array. This reduces the possibility of accidental flashing of lamps by electrostatic charges.

9 Claims, 5 Drawing Figures

U.S. Patent  Aug. 9, 1977  4,041,300
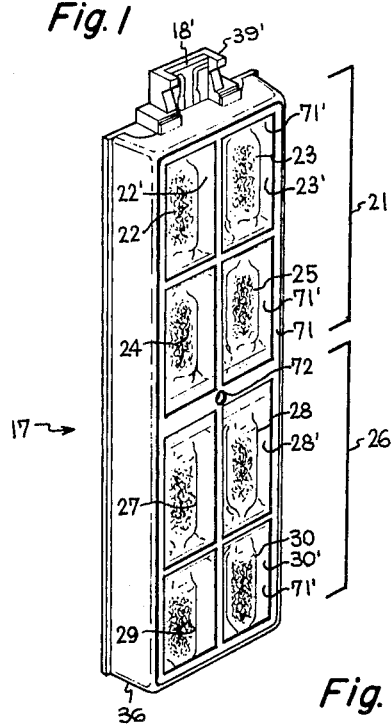
Fig. 1
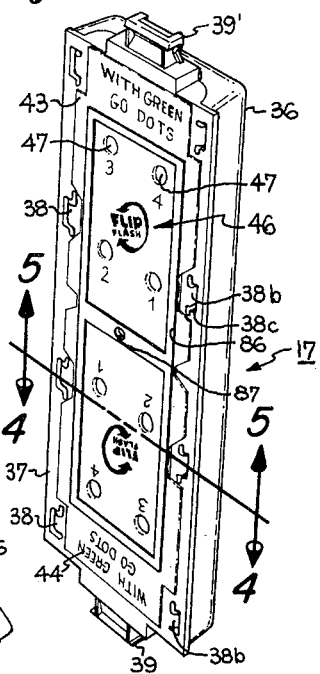
Fig. 3
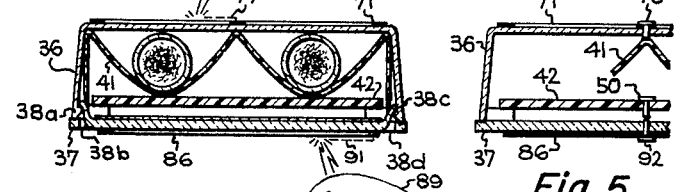
Fig. 4
Fig. 5
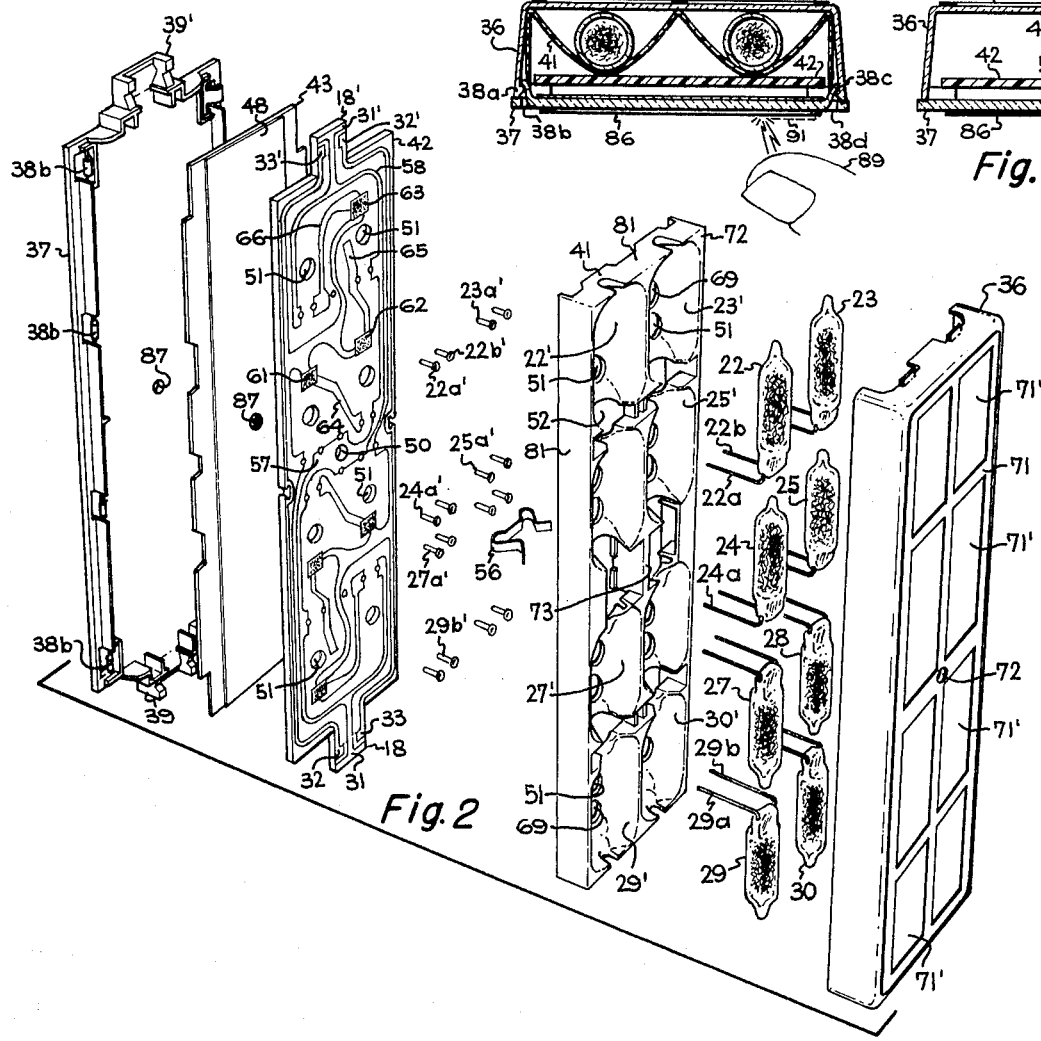
Fig. 2

PHOTOFLASH ARRAY WITH DISCHARGE PATH FOR ELECTROSTATIC CHARGES

CROSS-REFERENCES TO RELATED APPLICATIONS

Ser. No. 448,671, filed Mar. 6, 1974, Kurt H. Weber, "Multiple Flash Lamp Unit," now U.S. Pat. No. 3,937,946 and assigned the same as this invention.

Ser. No. 485,459, filed July 3, 1974, Richard Blount, "Multiple Flash Lamp Unit," now U.S. Pat. No. 3,952,320 and assigned the same as this invention.

Ser. No. 485,422, filed July 3, 1974, Paul T. Cote, "Multiple Flash Lamp Unit," now U.S. Pat. No. 3,980,875 and assigned the same as this invention.

Ser. No. 485,460, filed July 3, 1974, Paul T. Cote, "Protective Terminal for Multiple Flash Lamp Unit," now U.S. Pat. No. 3,980,876 and assigned the same as this invention.

Ser. No. 499,316, filed Aug. 21, 1974, Paul T. Cote, "Connector for Photoflash Array," now U.S. Pat. No. 3,912,442 and assigned the same as this invention. Ser. No. 508,334, filed Sept. 23, 1974 abandoned in favor of continuation-in-part patent application Ser. No. 635,848, filed Nov. 28, 1975, Richard Blount, "Photoflash Array Construction", assigned the same as this invention.

Ser. No. 509,410, James M. Hanson, filed Sept. 26, 1974, "Photoflash Lamp Array Having Electrically Connected Reflector," now U.S. Pat. No. 3,935,442 and assigned the same as this invention.

Ser. No. 510,362 filed Sept. 30, 1974, Richard Blount, Paul T. Cote, and Edward C. Zukowski, "Flash Array Having Shielded Switching Circuit," now U.S. Pat. No. 3,941,992 and assigned the same as this invention.

Ser. No. 618,595, filed Oct. 1, 1975, Paul T. Cote, "Photoflash Array," now U.S. Pat. No. 3,980,877 and assigned the same as this invention.

BACKGROUND OF THE INVENTION

The invention is in the field of multiple photoflash lamp units, such as planar arrays.

U.S. Pat. No. 3,894,226 to James M. Hanson describes a planar photoflash array in which flash lamps are connected to a circuit board containing thereon radiation-sensitive switching circuitry for sequentially flashing the lamps. An electrically conductive reflector unit is positioned between the lamps and the circuit board. The lamps, circuit board, and reflector unit are enclosed in a plastic housing, and the array is provided with connector means for connecting it to a camera or other device for applying firing voltage pulses to the array.

A flash array of the type just described, which is available in stores and is called "Flip Flash," utilizes so-called high voltage lamps which are flashed by high voltage pulses of a few thousand volts, at a low energy, such as can be produced by stressing a piezoelectric element contained in a camera or flash adapter. Since persons and objects can become electrostatically charged to several thousand volts (at low energy), especially in dry weather, there could be a problem of lamps accidentally flashing due to electrostatic charge when the array is handled or touched, by a charged person or object, in the vicinity of a lamp or certain parts of the sequencing circuit. This is due to the electrostatic discharge being coupled to or passing through the primers in one or more of the lamps, the primers constituting chemical material for igniting the lamps in response to a suitable voltage.

Some of the above-mentioned patent applications disclose techniques for reducing the likelihood of accidental electrostatic flashing of the lamps, including an electrically conductive reflector unit connected to electrical ground of the circuit, and additional electrical shielding means, and circuitry arrangements and connections. The last referenced Cote patent application discloses an arrangement of openings through the array housing wall, at locations near electrical ground in the array, to provide preferential paths for electrostatic discharges to the electrical ground instead of to sensitive places in the lamps or circuitry.

SUMMARY OF THE INVENTION

Objects of the invention are to provide an improved flash lamp array having reduced tendency of accidental flashing of lamps by electrostatic charges.

The invention comprises, briefly and in a preferred embodiment, a flash lamp array having a housing of electrically insulating material containing flash lamps and also containing electrical circuitry including electrical common or ground. A pattern of electrically conductive material is provided on the outer surface of the housing, and one or more openings are provided through the wall of the housing at or adjacent to said conductive pattern and also at or adjacent to said electrical ground in order to provide a preferential discharge path for an electrostatic charge, thus reducing the possibility of accidental flashing of the lamps by the electrostatic discharge. The aforesaid electrical ground may be a conductive reflector unit, circuit runs or connectors, or conductive members such as eyelets or the like. The openings through the housing wall may contain or be covered with metal or other electrically conductive material to seal them.

BRIEF DESCRIPTION OF THE DRAWING

FIG. 1 is a perspective view of a multiple flash lamp array in accordance with a preferred embodiment of the invention.

FIG. 2 is an exploded view of the array of FIG. 1 showing the internal parts.

FIG. 3 is a perspective view of the back of the array.

FIG. 4 is a sectional view taken on the line 4—4 of FIG. 3.

FIG. 5 is a sectional view of a portion of the array taken on the line 5—5 of FIG. 3.

DESCRIPTION OF THE PREFERRED EMBODIMENT

A multiple flash lamp unit 17 of the planar array type and containing a plurality of electrically fired flash lamps is provided with a plug-in connector tab 18 at the lower side or end thereof, adapted to fit into a socket of a camera or flash adapter as shown and described in the above-referenced patent applications. The lamp array 17 is provided with a second plug-in connector tab 18' at the top side or end thereof, whereby the array 17 is adapted to be attached to the camera socket in either of two orientations, i.e., with either the tab 18 or the tab 18' plugged into the socket. The array 17 is provided with an upper group 21 of flash lamps 22, 23, 24, and 25, and a lower group 26 of flash lamps 27, 28, 29, and 30, the lamps being arranged in a planar configuration. The lamps may be a high-voltage type as disclosed in U.S. Pat. No. 3,884,615 to John C. Sobieski. Reflectors 22', etc., are disposed behind the respective flash lamps, so that as each lamp is flashed, its light is projected forwardly of the array 17. The lamps are arranged and connected so that when the array is connected to a camera by the connector 18, only the upper group 21 of lamps will be flashed, and when the array is turned end for end and connected to the camera by the other connector 18', only the then upper group 26 of lamps will be flashed. By this arrangement, only lamps relatively far from the lens axis are flashable, thus reducing the undesirable red-eye effect, as is more fully described in the first of the above-referenced patent applications.

The construction of the array shown in the drawing comprises front and back housing members 36 and 37, which preferably are made of plastic and are provided with interlocking members 38 which can be molded integrally with the housing members and which lock the housing members together in final assembly to form a unitary flash array structure. FIG. 4 shows an interlocking member 38a carried at the rear of the side of the front housing member 36 interlocked with an interlocking member 38b is in the form of a latch tab having a transverse latching rib 38c molded integrally with the back housing member 37 by means of a projection of the mold which leaves an opening 38d through the back member 37 adjacent to the latch tab 38b. In the preferred embodiment shown, the front housing member 36 is a rectangular concavity and the back housing member 37 is substantially flat and includes integral extensions 39 and 39' at the ends thereof which partly surround and protect the connector tabs 18 and 18' and also function to facilitate mechanical attachment to the camera socket. Sandwiched between the front and back housing members 36 and 37, in the order named, are the flash lamps 22, etc., a unitary reflector member 41 (preferably of aluminum-coated plastic) shaped to provide the individual reflectors 22', etc., a printed circuit board 42 provided with integral connector tabs 18 and 18', and an indicia sheet 43 which may be provided with instructions, information 44, trademarks 46, and other indicia such as flash indicators 47 located behind the respective lamps and which change color or otherwise change in appearance due to heat and/or light radiation from a flashing lamp, thus indicating at a glance which of the lamps have been flashed and not flashed.

The indicia sheet 43 may be of paper or thin cardboard and provided with openings where the flash indicators 47 are desired, and flash indicator material 48, such as a sheet-like heat-sensitive plastic material, for example diaxially oriented polypropylene, which shrinks or melts when subjected to heat or radiant energy from an adjacent flashing lamp thus effectively changing the appearance or color of the openings in the indicia sheet 43. For example, the plastic material can be colored green on its back side by ink or other suitable means, and the green disappears and the opening becomes a different color (dark, for example) when the plastic shrinks or melts away due to heat from an adjacent flashing lamp. The front of the plastic (toward the lamps) should be coated with dark ink so as to absorb heat more readily. A single flash indicator sheet 48 may be arranged over all of the flash indicator openings. Openings 51 are provided through the reflector unit 41 and the circuit board 42 to facilitate radiation from flashing lamps reaching the flash indicators 47. The rear housing member 37 is transparent (either of clear material or provided with window openings) to permit viewing of the indicia on the indicia sheet 43. The front housing member 36 is transparent at least in front of the lamps 22, etc., to permit light from flashing lamps to emerge frontwardly of the array, and may be tinted to alter the color of light from the flash lamps.

The height and width of the rectangular array are substantially greater than its thickness, and the heights and widths of the reflector member 41 and circuit board 42 are substantially the same as the interior height and width of the housing member 36 to facilitate holding the parts in place.

The tab 18, which is integral with the circuit board 42, is provided with a pair of electrical terminals 31 and 32, and similarly the tab 18' is provided with a pair of terminals 31' and 32', for contacting terminals of a camera socket for applying flash actuation signals such as firing voltage pulses to the array. Each tab is provided with a third terminal 33 and 33', respectively, which functions to electrically short the circuitry of the inactive lower group of lamps when the array is plugged into a socket, as is described in the first above-referenced Blount patent application. The terminals 31 and 31' are shown as having a lateral "T-bar" configuration for temporarily shorting the socket terminals while the array is being plugged in, to discharge any residual voltage charge in the firing pulse source and also to reduce the likelihood of lamps being accidentally flashed by electrostatic voltage when the array is handled, as is disclosed in the above-referenced Cote patent application Ser. No. 485,460. A metal shield covers a large area of the back of the circuit board and is electrically grounded to the circuit area 57 at the front of the board by means of an eyelet 50 passing through the board.

The circuit board 42 has a "printed circuit" thereon, as will be described, for causing sequential flashing of the lamps by firing voltage pulses applied to the terminals 31, 32 or 31', or 32'. The top and bottom halves of the printed circuitry preferably are reverse mirror images of each other. The lead wires 22a, 22b, etc., of the lamps 22, etc., may be attached to the circuit board 42 in various ways, such as by means of metal eyelets 22a', 22b', etc., placed through openings in the board. The lead wires 22a, 22b, etc., pass through openings 52 in the reflector member 41 and into or through the respective pairs of eyelets 22a', 22b', etc., and the ends of the eyelets are crimped or bent to hold the lead wires and make electrical contact thereto and also to hold the eyelets in place with their heads in electrical contact with the circuit of the circuit board. A metal clip 56 is clipped onto the reflector member 41, which is made of metal or metal-coated plastic, and the rear of the clip 56 rests against the area 57 of an electrical ground circuit run 58 on the board and which includes the terminals 31 and 31' and which makes contact with one of the connector eyelets 22a' or 22b', etc., for each of the lamps 22, etc.

The circuit board terminal 32 is part of a conductor run that is electrically connected to lead-in wire 24a of lamp 24 at the eyelet 24a' and terminates at radiation switches 61, 62 and 63 respectively positioned near lamps 24, 25, and 23. A circuit board conductor run 64 is connected electrically to the remaining lead wire of flash lamp 25 at eyelet 25a' and terminates at the radiation switch 61. a circuit board conductor run 65 is connected to the remaining lead-in wire of flash lamp 23 at eyelet 23a' and terminates at the radiation switch 62. Similarly, a circuit board conductor run 66 is connected to the remaining lead-in wire of flash lamp 22 at eyelet 22b' and terminates at radiation switch 63.

The radiation switches 61, 62, and 63 are respectively in contact with and bridge across the circuit runs that are connected to them. The material for the radiation switches may be suitable material initially having an open circuit or high resistance, the resistance thereof becoming zero or a low value when the material receives radiation in the form of heat and/or light from a respective adjacent lamp, upon the lamp being flashed. For this purpose, each of the radiation switches is respectively positioned behind and near to a flash lamp 24, 25, 23. Windows in the form of transparent sections or openings 69 may be provided in the reflector in front of the switches as shown in FIG. 2 to facilitate radiation transfer. A suitable material for the radiation switches is silver oxide dispersed in a binder such as polyvinyl resin. Each of these radiation switches, upon receiving heat and/or light radiation from the adjacent lamp when it is flashed, changes from an open circuit or high resistance to a closed circuit or low resistance between its switch terminals on the circuit board.

As has been explained, the lower portion of the circuit board contains a substantially reverse mirror image of the same circuit shown in the upper part of the circuit board, and therefore will not be described in detail. It will be noted that the circuit runs from the plugged-in terminals 31 and 32 at the lower part of the circuit board extend upwardly so as to activate the circuitry in the upper half of the circuit board. Similarly, when the unit is turned around and tab 18' is plugged into a socket, the circuit board terminals 31' and 32' will be connected to and activate the lamps which then will be in the upper half of the circuit board, and hence in the upper half of the flash unit 17. This accomplishes, as has been stated, the desirable characteristic whereby only the group of lamps relatively farthest away from the lens axis will be flashed, thereby reducing or eliminating the undesirable red-eye effect.

The circuit on the circuit board 42 functions as follows. Assuming that none of the four lamps in the upper half of the unit 17 have been flashed, upon occurrence of a first firing pulse applied across the terminals 31, 32, this pulse will be directly applied to the lead-in wires of the first-connected flash lamp 24, whereupon the lamp 24 flashes and becomes an open circuit between its lead-in wires. Heat and/or light radiation from the flashing first lamp 24 causes the adjacent radiation switch 61 to become a closed circuit (or a low value of resistance), thereby connecting the circuit board terminal 32 electrically to the lead-in wire of the second lamp 25 at eyelet 25a'. By the time this occurs, the firing pulse has diminished to a value insufficient to cause the second lamp 25 to flash. When the next firing pulse occurs, it is applied to the lead-in wires of the second lamp 25, via the now closed radiation switch 61, whereupon the second lamp 25 flashes, thereby causing radiation switch 62 to assume zero or low resistance, and the second lamp 25 now has an open circuit or high resistance between its lead-in wires. When the next firing pulse occurs, it is applied via now closed radiation switch 62 to the third lamp 23, thereby firing the lamp which becomes an open circuit, and the radiation from it causes the radiation switch 63 to become essentially a closed circuit across its terminals. Thus, the next firing pulse will be applied, via now closed radiation switch 63, to the lead-in wires of the fourth flash lamp 22, thereupon causing the lamp to flash. Since this lamp is the last lamp in the active circuit, it does not matter whether its lead-in wires are an open or closed circuit after flashing. Additional flash lamps, radiation switches, and electrical conductors can be employed, if desired, using the just described principles. When the flash unit is turned around and the other connector tab 18' is attached to the camera socket, the group of lamps that then become uppermost and relatively farthest away from the lens axis will be in an active circuit and will be flashed in the same manner as has been described. In a preferred embodiment, the lamps 22, etc., are high voltage types, requiring about 2000 volts at low current for flashing, and they are fired by impacting or stressing a piezoelectric element in the camera.

In accordance with the invention, electrically conductive material is provided on the surface of the array housing, and a path for electrostatic discharges is provided between the conductive material and the electrical ground of the array. For example, a pattern 71 of metal is provided on the front of the front housing member 36, in the form of a matrix having a window opening 71' in front of each of the individual lamp reflectors 22', 23', etc. so as not to unduly restrict the amount of light projected forwardly when a lamp is flashed. Thus, the front of each reflector 22', 23', etc. is in effect surrounded by the metal pattern or configuration 71, and also each of the flash lamps 22', 23', etc. is in effect "surrounded" by a metal frame in front of it. To provide an electrical discharge path between the metal 71 and electrical ground within the array, an opening 72 is provided through the front member 36 at a point where it communicates the metal pattern 71 with a point 73 of the electrically grounded reflector unit 41 which is adjacent to the rear surface of the front wall of the front cover 36. The metal pattern 71 may be made by vapor deposition, silk screening, hot-stamping or other suitable method, the metal being aluminum or other electrically conductive material such as transparent tin oxide which may be coated over the entire surface if desired.

When a finger 76 (FIG. 4) of an electrostatically charged person (or other electrostatically charged object) is brought near to the front of the array, the chances are favorable that a discharge will prefer taking a path 77 to the nearest portion of the metal pattern 71, and then through the opening 72 to the electrical ground reflector unit 41, and thence into space or to earth ground, rather than through the wall of the front housing member 36 (either directly or capacitively) to one of the lamps 22, 23, etc., By thus diverting the discharge path away from the lamps, there is a reduced possibility of accidental flashing of the lamps by the electrostatic discharges.

In a typical Flip-Flash array, the width between the frame edges of the conductor 71 in front of each lamps may be about three-quarters of an inch. For a person or object charged to 20,000 volts (at low energy), which can occur in dry winter weather, the discharge will prefer to travel as far as about ¼ of an inch to the conductive pattern 71 rather than through the wall (of 0.03 inch thick polystyrene plastic, for example) of the front cover 36 and hence to a lamp 22, 23, etc. Considering that a person's finger is normally more than ½ inch diameter, such an arrangement virtually assures that the electrostatic discharge will always prefer a path to the conductive pattern 71 and hence to electrical ground, thus bypassing the primers or other sensitive parts of the lamps.

The opening 72 may be sealed by filling it or covering it with conductive material 78 (FIG. 5) such as in the form of a rivet, which will slightly improve the electrical discharge path to electrical ground. One or more additional openings, sealed or unsealed, may be provided between member 71 and electrical ground. Electrostatically charged persons or objects applied to the sides and ends of the array housing incur an appreciably lower possibility of accidental flashing of lamps, because of the broad side and end surfaces 81 of the electrically grounded reflector unit 41.

The rear surface of the array is protected from accidental electrostatic flashing of lamps by an electrically conductive pattern 86 on the back surface of the back housing member 37. From the rear of the array, the most sensitive spots for accidental electrostatic flashing are the areas behind and adjacent to the "hot" lamp leads 22b, 23a, 24a, 25a, etc. of the flash lamp lead-in wires and their associated connecting eyelets 22b, 23a, 24a, 25a, etc., these hot leads and eyelets being other than the electrically grounded leads and eyelets of the lamps. The conductive pattern 86 on the back of the array is arranged to pass over or adjacent to these hot leads and eyelets. This rear conductive pattern is provided with a path to electrical ground in the array by means of openings 87 through the back wall of the back housing member 37, and the indicia sheet 43, communicating (for electrostatic charges) the rear conductive pattern 86 with an electrical ground point in the array such as is provided by the rivet 50 or other electrical ground member extending from the electrically grounded area 57 of the printed circuit and through the board 42 to a point adjacent to the rear array opening 87. When an electrostatically charged person or object 89 comes near the back of the array, the discharge path 91 will tend to follow a path to the rear conductive pattern 86 and hence to electrical ground (via opening 87) rather than going (directly or capacitively) through the back housing wall to a hot point of the circuitry which could cause accidental flashing of lamps. The openings 72 and 87 may be circular or other desired shape, and their size is not critical.

The rear array opening can be sealed by filling or covering it, such as by a rivet 92 (FIG. 5). The rear conductive pattern 86 can be applied by any suitable method such as described above on the front conductive pattern 71. One or more other openings, sealed or unsealed, can be provided for electrically grounding the rear conductive pattern 86. The latch tab molding openings 38 can function as the electrical path to ground if the rear conductive pattern is arranged to be at or near to one or more of them, since the rear edge of the reflector unit 41 is near to them.

It will be appreciated that the invention provides electrically conductive patterns on the outer surface of the array housing (or on the interior walls of the housing, but with lesser effect) which will greatly reduce the possibility of accidental flashing of the lamps by electrostatic charges, by way of conducting the electrostatic discharges into space or to earth ground rather than permitting them to reach sensitive parts of the lamps or circuitry that could cause accidental flashing of lamps. Other conductive patterns can be provided on the flash array in accordance with the principles of the invention.

The invention is particularly useful in flash arrays employing high-voltage lamps which flash at low energy, such as 100 volts or more at less than one millijoule, (such as about 100 microjoules) because such lamps can become accidentally flashed by electrostatic discharges.

While preferred embodiments of the invention have been shown and described various other embodiments and modifications thereof will become apparent to persons skilled in the art, and will fall within the scope of the invention as defined in the following claims.

What I claim as new and desire to secure by Letters Patent of the United States is:

1. A flash lamp array comprising a walled hollow housing containing flash lamps and circuitry including electrical ground, conductive material on at least a portion of the outer surface of said housing, and means providing a path through the wall of said housing for electrostatic discharges between said conductive material and said electrical ground, thereby reducing the possibility of accidental flashing of lamps by said electrostatic discharges.

2. An array as claimed in claim 1, in which said conductive material is transparent.

3. An array as claimed in claim 1, said electrical ground including a member adjacent to the inner surface of said housing at a location in alignment with a portion of said conductive material, and in which said means providing a path for electrostatic discharges comprises an opening through the wall of said housing between said ground member and said portion of the conductive material.

4. An array as claimed in claim 3, in which conductive material is provided in said opening.

5. An array as claimed in claim 3, in which said electrical ground member includes a conductive reflector unit positioned to reflect light from said lamps when flashed.

6. An array as claimed in claim 3, in which said flash lamps are arranged in a planar configuration for projecting light therefrom through a front wall of said housing when flashed, said conductive material being on the outer surface of said front wall and configured in the form of a matrix having a window opening in front of each lamp, each of said window openings being surrounded by a frame of said conductive material.

7. An array as claimed in claim 3, in which said flash lamps are arranged in a planar configuration for projecting light therefrom through a front wall of said housing when flashed, said array including a circuit board contained within said housing adjacent to a rear wall thereof and provided with lamp flashing circuitry thereon including sensitive portions which could cause lamps to be flashed by said electrostatic discharges, said conductive pattern being on the outside surface of said rear wall and configured to be behind said sensitive portions of the circuit board.

8. An array as claimed in claim 7, in which said electrical ground comprises a conductive member carried on said circuit board.

9. An array as claimed in claim 7, in which said sensitive portions of the circuit board comprise connections to a "hot" lead-in wire of each of said lamps, said connections being arranged in rows on said circuit board, and said conductive pattern being configured in a frame-like pattern so as to be behind all of said connections to hot lamp lead-in wires.

* * * * *